May 12, 1970  R. J. HUGHES  3,512,122
TEST CONNECTOR FOR ELECTRICAL EQUIPMENT
Filed Feb. 19, 1968
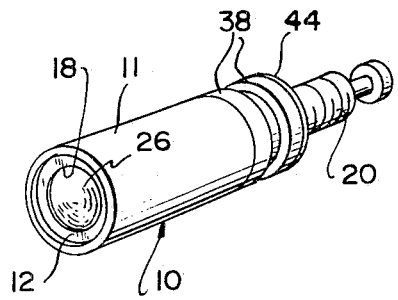
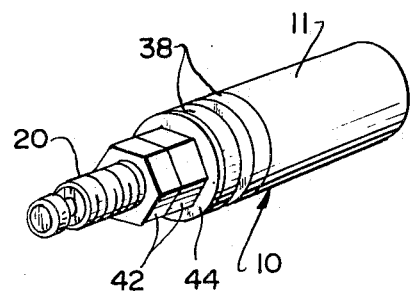
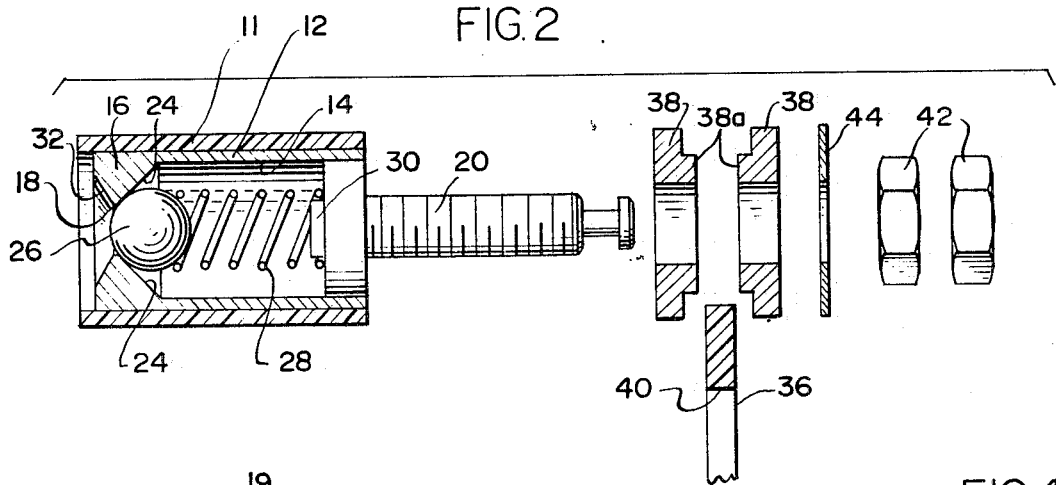
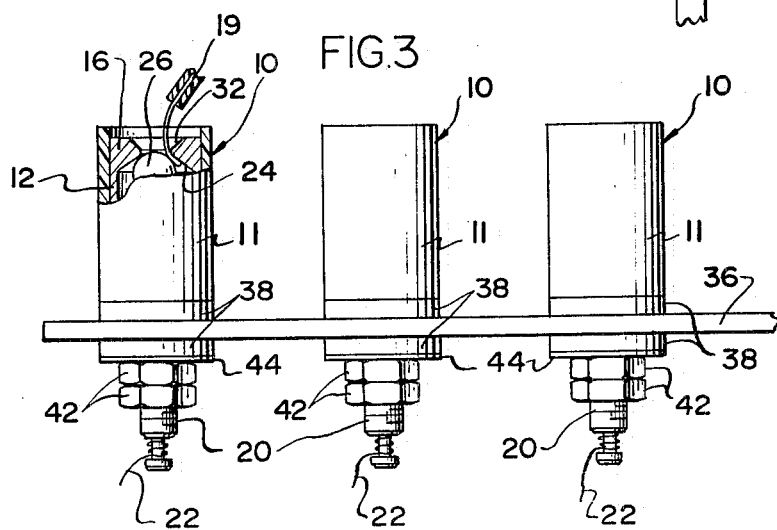
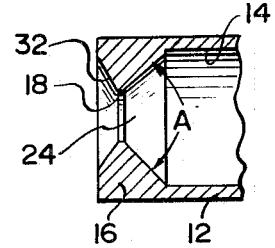
INVENTOR.
RICHARD J. HUGHES
BY *Hofgren, Wegner, Allen, Stellman & McCord*
ATTORNEYS.

United States Patent Office 3,512,122
Patented May 12, 1970

3,512,122
TEST CONNECTOR FOR ELECTRICAL
EQUIPMENT
Richard J. Hughes, 6845 N. Oriole Ave.,
Chicago, Ill. 60631
Filed Feb. 19, 1968, Ser. No. 706,554
Int. Cl. H01r 9/12
U.S. Cl. 339—273                2 Claims

ABSTRACT OF THE DISCLOSURE

A quick connection device for electrical equipment, including an open ended tubular housing which surrounds an electrically conductive, substantially cylindrical sleeve. The sleeve has an interior cavity with an opening at one end thereof and with a frusto-conical seat about the opening on the interior of the cavity. A terminal or connecting member is electrically connected to the opposite end of the sleeve for connection to test meters and the like. A resiliently biased ball member engages the opening in the sleeve and is so related in size and bias to the sleeve that a test wire can be manually inserted and removed from electrical connection with the sleeve by simple push and pull movements.

Background of the invention

There is a need for quick connections in test operations for providing a fast, positive "slip-in" connection for test wires, pigtail components and the like. Such connections greatly reduce the hook-up time normally required in production testing where test wire leads must be temporarily connected to meters and the like. With such connectors, it is important that all-around insulation be provided to minimize conductor exposure and to avoid unintentional connections. This invention relates to providing an improved quick connection device for electrical equipment to fulfill these needs.

Summary of the invention

The principal object of this invention in to provide a new and improved quick connection device for production test operations and the like.

Another object of this invention is to provide a slip-in type quick connection device of the character described in which an electrically conductive ball is resiliently biased against a frusto-conical seat about an opening in an electrically conductive sleeve so that a wire or similar electrical component can be inserted into the opening in the sleeve and held by the ball against the frusto-conical seat, and the wire can be easily disconnected with a pulling force approximately equal to the slip-in force. An insulating housing covers the sleeve and provides all-around side insulation. A terminal connecting member is electrically connected to the sleeve for receiving the terminals of testing meters and the like. An electrically conductive coil spring is disposed in the sleeve and bears against the ball member at one end and against the terminal member at the other end.

A further object of this invention is to provide a quick connection device as set forth in the preceding paragraph in which the end of the electrically conductive sleeve in which the wire receiving opening is disposed is recessed from the surrounding portions of the insulating housing to minimize conductor exposure and thereby avoid unintentional connection of a test wire with the conductive components of the connection device.

Still another object of this invention is provided a quick connection device of the character described which is easily mounted on a test panel or the like.

Other objects and advantages of the invention will become apparent from the following description taken in connection with the accompanying drawings.

Description of the drawings

FIG. 1 is a perspective view of the quick connection device of this invention, as viewed from the end thereof which receives test wire leads for temporary connection;

FIG. 1A is a perspective view of the opposite end of the device, illustrating a form of terminal or connecting means and a means for mounting the device on a test panel;

FIG. 2 is an exploded central sectional view of the device of this invention;

FIG. 3 is an elevational view illustrating a plurality of the connection devices of this invention mounted on a test panel or the like, with a portion of one of the devices in section and receiving a test wire; and FIG. 4 is a partial central section through the sleeve member of this invention.

Detailed description of the invention

Referring to the drawings, the invention is illustrated herein as comprising a test connector 10 which has a hollow open ended housing 11 of insulating material such as phenolic or like material. The housing illustrated is tubular but it can take any appropriate configuration. A cylindrical sleeve-like member 12 is disposed within the housing 11 and has an interior cavity 14 extending along a substantial portion thereof. The sleeve member 12 is provided at one end (the left end as viewed in FIG. 2) with a constricted portion 16 which has a circular, centrally disposed opening 18 through which test wire leads 19 (FIG. 3) may be inserted and temporarily connected. The sleeve member 12 is formed of brass or similar conductive material and is in conductive engagement with a terminal or connecting member 20 which is press-fitted into the end of the sleeve member 12 opposite the opening 18. The terminal member 20 is of the wrap-around post type for receiving leads 22 from testing meters and the like. Obviously, any variety of styles of terminal members may be employed.

The constricted portion 16 of the sleeve member 12 is provided with a frusto-conical seat 24 about the opening 18 on the interior of the cavity 14. A ball member 26, of steel or similar conductive material, is resiliently biased by a coil spring 28 against the seat 24. The coil spring 28 is "closed" at both ends and bears against the ball member 26 at one end and is positioned about a boss 30 on the terminal member 20 at the other end. The spring 28 is preferably made of conductive material such as music wire. The constricted portion 16 of the sleeve member 12 also has a tapered surface 32 about the opening 18 on the outside of the sleeve to guide the test wire 19 into the opening 18. The angle of the taper on the surface 32 is not critical.

The end of the sleeve member 12 adjacent the opening 18 is spaced from the adjacent marginal edge of the housing 11, as best seen in FIG. 2, so as to form a recess with the insulating material of the housing 11 surrounding the recess to minimize conductor exposure and avoid unintentional contact of a test wire 19 or other conducting material to either the conductive sleeve member 12 or ball member 26.

The preferred embodiment is shown in the drawings, but this embodiment is not to be construed as to limit the scope of the invention. For instance, the sleeve may be eliminated and the seat 24 may be formed on the housing 11, with the ball and spring providing the conducting means between the test wire 19 and the terminal member 20. Or the sleeve may be the only conductive path, with the ball and spring being made of other material.

To temporarily connect a test wire to the quick connection device of this invention, the test wire 19 is inserted into the opening 18 between the ball member 26 and the seat 24 in a manner as illustrated in FIG. 3. The ball member 26 will move against the biasing of the coil spring 28 and hold the test wire against the seat 24. The test wire is removed from the connector by simply pulling the wire out of the opening 18 with approximately the same force beng required to remove the wire as was required to insert the wire between the ball member 26 and the seat 24. This equalizing of forces is afforded by the particular angular and size relationships between the ball member 26, the seat 24 and the spring 28, as set forth below.

The size of the ball member 26 and the opening 18, and the taper of the frusto-conical seat 24, should have the following relationships. First of all, the ball 26 is preferably sufficiently larger than the opening 18 so that its line of contact with the seat 24 is spaced from the perimeter of the opening 18 to insure that the test wire 26 is held tangentially of the ball along the line formed by the seat 24, as illustrated in FIG. 3. Naturally, if the opening 18 is increased the ball 26 must accordingly be increased to maintain this straight line relation. Second, the inclusive angle A (FIG. 4) of the frusto-conical seat 24 should be maintained approximately 80°. This angle has proven through experimentation to be the angle which will substantially equalize the force necessary to insert the test wire 19 between the ball and the seat and the force necessary to extract the test wire therefrom. However, this angle could possibly vary plus or minus 10° if necessary under certain circumstances.

Through experimentation, the optimum spring pressure for holding a normal test wire is approximately 1.85 lb./in. rate for a 1/4 or 3/16 in. ball member. Of course, this rate may be changed slightly depending upon the size of the ball member 26 and may go down as far as 1.00 lb./in. rate for a 1/16 in. ball member or a 3.00 lb./in. rate for a 3/8 in. ball member.

Means are shown for mounting the test connector of this invention on a flat test panel 36 and includes a pair of dielectric shoulder washers 38 of phenolic or like material which bear against opposite sides of the panel 36. Each washer 38 has an annular boss portion 38a which extends into an enlarged mounting hole 40 through the panel 36. The post of the terminal member 20 is threaded for receiving a pair of nuts 42. A brass washer 44 is disposed between the nuts 42 and the outermost shoulder washer to prevent the nut from chewing into the shoulder washer when the connector is tightened to the panel 36. FIG. 3 shows three test connectors mounted on a test panel 36 and facing in a common direction for receiving various test wires. Obviously, such a device as disclosed herein has practically unlimited applications to greatly reduce the hook-up time normally required in production test operations, where test wire leads must be temporarily connected.

The foregoing detailed description has been given for clearness of understanding only and no unnecessary limitations should be understood therefrom as some modifications will be obvious to those skilled in the art.

I claim:
1. A quick connection device for electrical equipment and the like, comprising: a housing having an interior cavity; means defining an opening from the exterior of the housing to said interior cavity; means defining a frusto-conical seat on the interior of said housing about said opening, said frusto-conical seat being tapered at an inclusive angle of approximately 80°; a ball member having a diameter larger than the largest cross dimension of said opening and being resiliently biased against the seat about said opening so that a wire or similar electrical component can be inserted into said opening and held by the ball member against said seat; a terminal member on said housing, and means for establishing electrical conductivity between said wire and said terminal member as a result of the wire being held by said ball member against said seat.

2. The quick connection device of claim 1 wherein said ball member is of a size sufficiently larger than said opening so that the ball bears against said frusto-conical seat spaced from the perimeter of said opening.

References Cited

UNITED STATES PATENTS

| 2,701,871 | 2/1955 | Rauch | 339—203 X |
| 2,761,115 | 8/1956 | Visconti | 339—273 X |
| 3,376,545 | 4/1968 | Anzini | 330—273 |

FOREIGN PATENTS

| 968,815 | 5/1950 | France. |
| 658,906 | 10/1951 | Great Britain. |
| 721,999 | 6/1942 | Germany. |
| 420,316 | 3/1967 | Switzerland. |

RICHARD E. MOORE, Primary Examiner

U.S. Cl. X.R.

339—215